(12) United States Patent
Templeman et al.

(10) Patent No.: US 11,552,986 B1
(45) Date of Patent: Jan. 10, 2023

(54) CYBER-SECURITY FRAMEWORK FOR APPLICATION OF VIRTUAL FEATURES

(71) Applicant: FireEye, Inc., Milpitas, CA (US)

(72) Inventors: Gregory Templeman, Manteca, CA (US); Yasir Khalid, Fremont, CA (US)

(73) Assignee: FireEye Security Holdings US LLC, Milpitas, CA (US)

( * ) Notice: Subject to any disclaimer, the term of this patent is extended or adjusted under 35 U.S.C. 154(b) by 260 days.

(21) Appl. No.: 15/197,653

(22) Filed: Jun. 29, 2016

Related U.S. Application Data

(60) Provisional application No. 62/274,024, filed on Dec. 31, 2015.

(51) Int. Cl.
  *H04L 29/06* (2006.01)
  *H04L 9/40* (2022.01)
  *G06F 21/56* (2013.01)

(52) U.S. Cl.
  CPC .......... *H04L 63/145* (2013.01); *G06F 21/562* (2013.01); *G06F 21/566* (2013.01); *H04L 63/1425* (2013.01)

(58) Field of Classification Search
  CPC ....... G06F 21/566; G06F 21/562; G06F 21/56
  See application file for complete search history.

(56) References Cited

U.S. PATENT DOCUMENTS

| 4,292,580 A | 9/1981 | Ott et al. |
|---|---|---|
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |

(Continued)

FOREIGN PATENT DOCUMENTS

| GB | 2439806 A | 1/2008 |
|---|---|---|
| GB | 2490431 A | 10/2012 |

(Continued)

OTHER PUBLICATIONS

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

(Continued)

*Primary Examiner* — Jason K Gee
(74) *Attorney, Agent, or Firm* — Rutan & Tucker LLP

(57) ABSTRACT

A non-transitory storage medium having stored thereon logic wherein the logic is executable by one or more processors to perform operations is disclosed. The operations may include parsing an object, detecting one or more features of a predefined feature set, evaluating each feature-condition pairing of a virtual feature using the one or more values observed of each of the one or more detected features, determining whether results of the evaluation of one or more feature-condition pairings satisfies terms of the virtual feature, and responsive to determining the results of the evaluation satisfy the virtual feature, performing one or more of a static analysis to determine whether the object is associated with anomalous characteristics or a dynamic analysis on the object to determine whether the object is associated with anomalous behaviors.

23 Claims, 6 Drawing Sheets

(56) References Cited

U.S. PATENT DOCUMENTS

| | | |
|---|---|---|
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,373,664 B2 * | 5/2008 | Kissel .................. H04L 51/212<br>726/13 |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,538 B1 * | 4/2011 | Israel .................. H04L 63/0263<br>709/201 |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,401,982 B1 * | 3/2013 | Satish .................. G06N 20/00<br>706/20 |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |

(56) References Cited

U.S. PATENT DOCUMENTS

| | | |
|---|---|---|
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,015,814 B1 * | 4/2015 | Zakorzhevsky ........ G06F 21/51 726/4 |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |

(56) References Cited

U.S. PATENT DOCUMENTS

| | | |
|---|---|---|
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Farbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0079379 A1* | 4/2007 | Sprosts .............. H04L 63/145 726/24 |

(56) References Cited

U.S. PATENT DOCUMENTS

| | | |
|---|---|---|
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |

(56) References Cited

U.S. PATENT DOCUMENTS

| | | |
|---|---|---|
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupar et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0165203 A1* | 6/2014 | Friedrichs ............ G06F 21/552 726/24 |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1* | 1/2015 | Pidathala ............ H04L 63/1433 726/22 |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 02/006928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Hiroshi Shinotsuka, Malware Authors Using New Techniques to Evade Automated Threat Analysis Systems, Oct. 26, 2012, http://www.symantec.com/connect/blogs/, pp. 1-4.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Lastline Labs, The Threat of Evasive Malware, Feb. 25, 2013, Lastline Labs, pp. 1-8.

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

"Mining Specification of Malicious Behavior"—Jha et al, UCSB, Sep. 2007 https://www.cs.ucsb.edu/.about.chris/research/doc/esec07.sub.-mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.jsp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information". Proceedings of the 5th ACM workshop on Privacy in electronic society. ACM, 2006.

(56) References Cited

OTHER PUBLICATIONS

Baecher, "The Nepenthes Platform: An Efficient Approach to collect Malware", Springer-verlag Berlin Heidelberg, (2006), pp. 165-184.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cisco, Configuring the Catalyst Switched Port Analyzer (SPAN) ("Cisco"), (1992).

Clark, John, Sylvian Leblanc,and Scott Knight. "Risks associated with usb hardware trojan devices used by insiders." Systems Conference (SysCon), 2011 IEEE International. IEEE, 2011.

Cohen, M.I., "PyFlag—An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K., (Oct. 23-26, 2005).

Crandall, J.R., et al., "Minos:Control Data Attack Prevention Orthogonal to Memory Model", 37th International Symposium on Microarchitecture, Portland, Oregon, (Dec. 2004).

Deutsch, P., "Zlib compressed data format specification version 3.3" RFC 1950, (1996).

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

Excerpt regarding First Printing Date for Merike Kaeo, Designing Network Security ("Kaeo"), (2005).

Filiol, Eric, et al., "Combinatorial Optimisation of Worm Propagation on an Unknown Network", International Journal of Computer Science 2.2 (2007).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Gibler, Clint, et al. AndroidLeaks: automatically detecting potential privacy leaks in android applications on a large scale. Springer Beriin Heidelberg, 2012.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hjelmvik, Erik, "Passive Network Security Analysis with NetworkMiner", (IN)Secure, Issue 18, (Oct. 2008), pp. 1-100.

Idika et al., A-Survey-of-Malware-Detection-Techniques, Feb. 2, 2007, Department of Computer Science, Purdue University.

IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Krasnyansky, Max, et al., Universal TUN/TAP driver, available at https://www.kernel.org/doc/Documentation/networking/tuntap.txt (2002) ("Krasnyansky").

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Liljenstam, Michael, et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].

Marchette, David J., "Computer Intrusion Detection and Network Monitoring: A Statistical Viewpoint", ("Marchette"), (2001).

Margolis, P.E., "Random House Webster's 'Computer & Internet Dictionary 3rd Edition'", ISBN 0375703519, (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware"", Security and Privacy in Communication Networks. Springer Berlin Heidelberg, 2010. 20-34.

Miori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

(56) References Cited

OTHER PUBLICATIONS

Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendertvan Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham, "Insertion, Evasion, and Denial of Service: Eluding Network Intrusion Detection", Secure Networks, ("Ptacek"), (Jan. 1998).
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

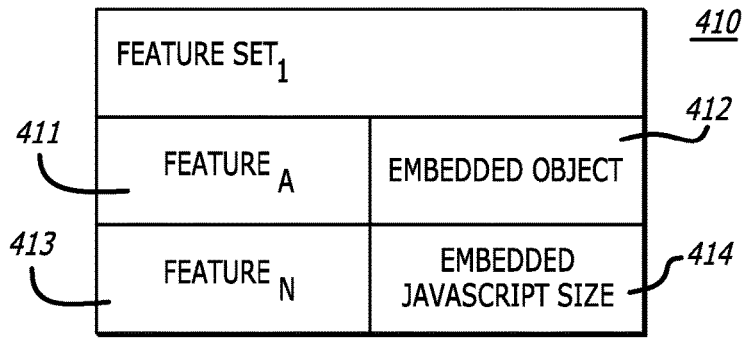
FIG. 4A
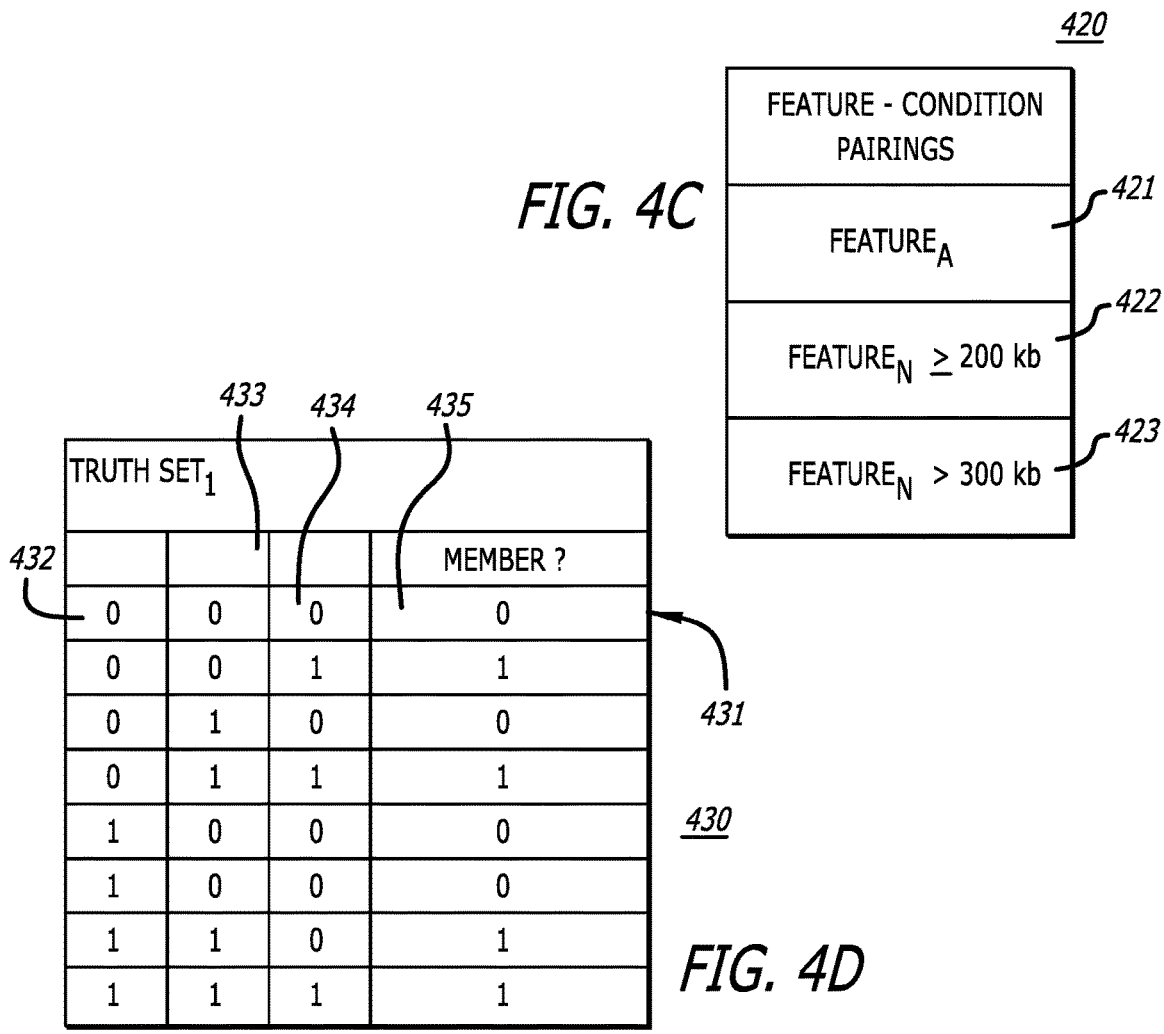
FIG. 4B
FIG. 4C
FIG. 4D

FIG. 5
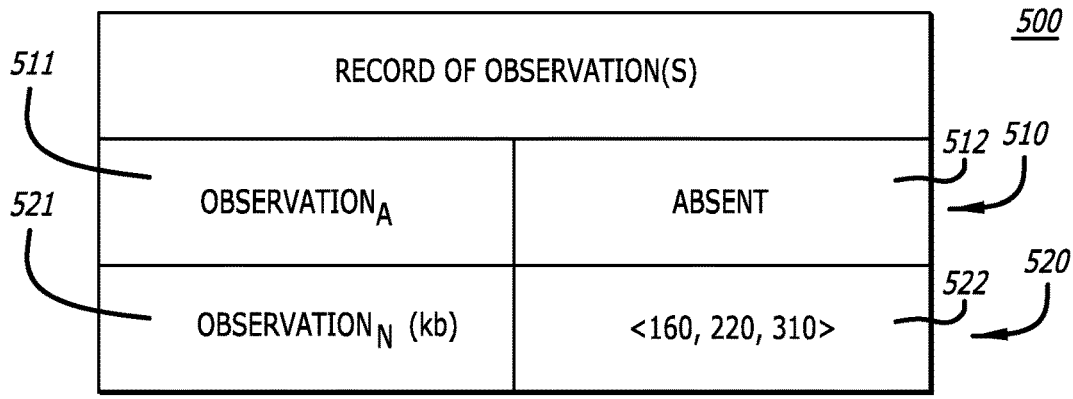
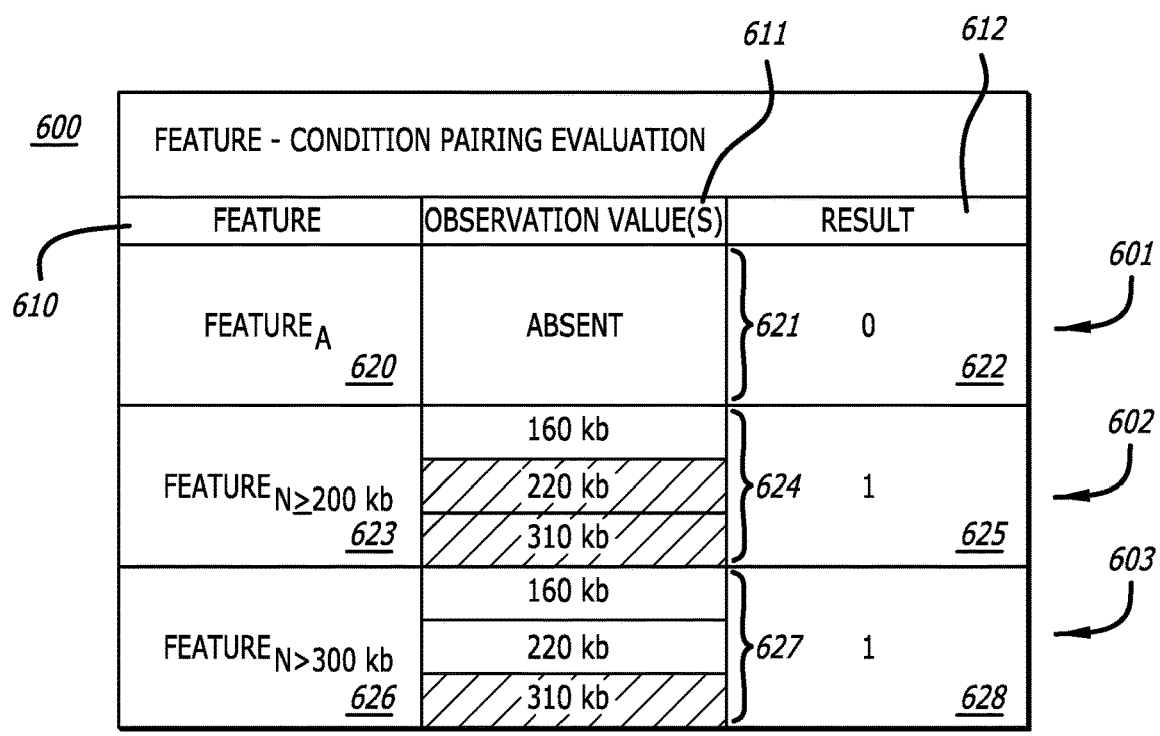
FIG. 6

US 11,552,986 B1

CYBER-SECURITY FRAMEWORK FOR APPLICATION OF VIRTUAL FEATURES

CROSS-REFERENCE TO RELATED APPLICATIONS

This application claims the benefit of priority on U.S. Provisional Application No. 62/274,024, filed Dec. 31, 2015, the entire contents of which are incorporated by reference herein.

FIELD

Embodiments of the disclosure relate to the field of cyber security. More specifically, embodiments of the disclosure relate to a malware detection technique for performing an analysis of a group of objects, an object or a sub-object to determine whether further analysis should be performed on the group of objects, the object or the sub-object.

GENERAL BACKGROUND

Current network security appliances receive large amounts of data to analyze, possibly prior to passing to one or more endpoint devices. The large amounts of data make timely analysis difficult as analyzing the entire amount of received data is time-consuming and processing-intensive. Therefore, current network security appliances attempt to employ a filtering process that acts to determine whether portions of the received data exhibit some characteristics of suspiciousness prior to performing an in-depth analysis on the one or more portions of the received data.

However, current filtering techniques are reactive and attempt to match extracted features or other indicators of known malware with a portion of the received data in order to determine whether the portion of received data is suspicious. Specifically, malware detection systems within network security appliances often parse received data attempting to identify and then match a feature of the received data with an indicator of known malware to assess suspiciousness or even maliciousness. This technique often leads to false positives as benign (e.g., non-malicious) data may share an indicator with malware. As a result, in-depth malware analysis may be performed on the benign data, wasting time and requiring unnecessary processing. Of course, where the indicator is a fingerprint or signature in the form of a hash of known malware, the chance of a match with benign data is greatly reduced, but such a fingerprint or signature is often not available (e.g., as is the case with 'zero day' malware).

Many different malware detection approaches can suffer the effects of false positives. Known Intrusion Protection Systems (IPS) and Intrusion Detection Systems (IDS) are noteworthy for producing an enormous rate of false positives. Known "two-stage" advanced malware detection systems deployed at the periphery of a network employ a first static analysis stage used to filter incoming data before submitting that portion deemed suspicious for second-stage dynamic analysis via execution in a virtual environment. In such systems, the static analysis is configured to avoid false negatives and, as a trade-off, can unfortunately tag benign data as suspicious and then submit those false positives for dynamic analysis.

Additionally, received data may contain one or more features that seem benign in an isolated manner but, combined with other seemingly suspicious, malicious or benign features, are actually part of a malicious cyber-attack.

BRIEF DESCRIPTION OF THE DRAWINGS

Embodiments of the invention are illustrated by way of example and not by way of limitation in the figures of the accompanying drawings, in which like references indicate similar elements and in which:

FIG. 4A is a sample illustration of a virtual feature.

FIG. 4B is a block diagram of a sample feature set from which the virtual feature of FIG. 4A is derived.

FIG. 4C is a sample table containing feature-condition pairings corresponding to the virtual feature of FIG. 4A.

FIG. 4D is a sample table containing the truth set corresponding to the virtual feature of FIG. 4A.

FIG. 5 is a block diagram of a sample table containing recorded observation values corresponding to the virtual feature of FIG. 4A and a sample object received by the threat detection system.

FIG. 6 is a block diagram of a sample table containing values representing feature-condition pairing evaluations corresponding to the virtual feature of FIG. 4A and the sample object received by the threat detection system of as discussed in FIG. 5.

DETAILED DESCRIPTION

Figure 1:
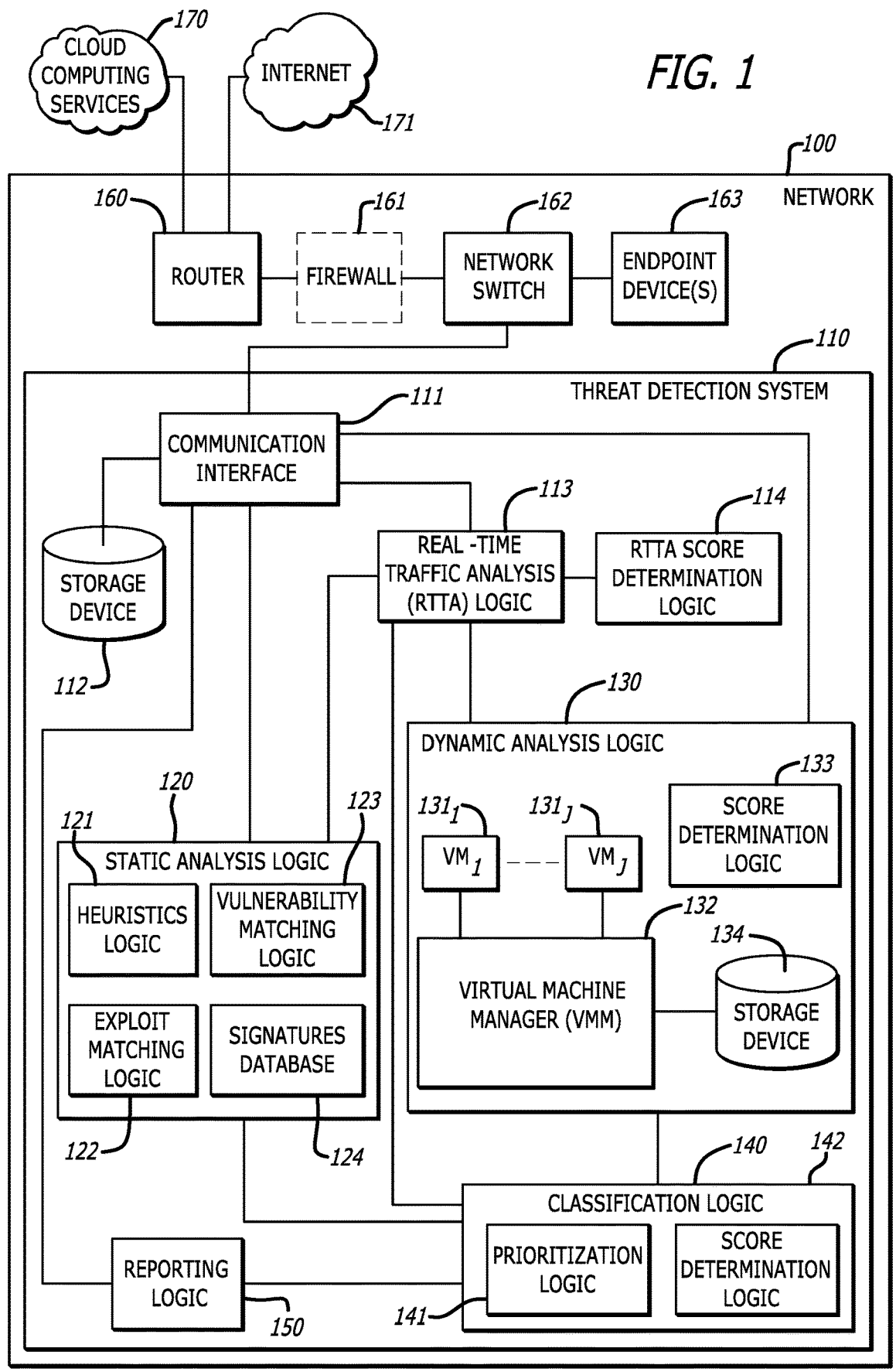
Referring to FIG. 1, an exemplary block diagram of a threat detection system 110 including a real-time traffic analysis logic 111 deployed within the network 100 is shown.

Various embodiments of the disclosure relate to a real-time traffic analysis that determines whether a portion of received data should be provided to a static analysis logic and/or a dynamic analysis logic for an in-depth analysis. Such a real-time traffic analysis improves detection of exploits, malware attacks and/or anomalous characteristics/behaviors as the initial analysis performed by a real-time traffic analysis logic determines whether at least a portion of the received data has at least a first level of suspiciousness and/or maliciousness to warrant an in-depth analysis by either a static analysis logic and/or a dynamic analysis logic.

Real-time traffic analysis seeks to utilize extracted features of malware (which may themselves provide an indication that the portion of received data is suspicious and/or malicious), and/or seemingly benign features (which in isolation may not provide an indication that the portion of received data is suspicious and/or malicious) to create a more tailored, or directed, analysis. Real-time traffic analysis utilizes one or more "virtual features," which may be each a combination of one or more features, typically expressed as a logical expression. Additionally, a condition may be applied to each feature within the virtual feature. A condition applied to a feature seeks to limit the values evaluated during real-time traffic analysis to those that, through experiential knowledge and/or machine learning, are known to be suspicious and/or malicious (the application of a condition to a feature may be referred to as a feature-condition pairing). Thus, the combination of feature-condition pairings within a logical expression (e.g., feature-condition pairings separated by logical operators comprising a virtual feature) leads to a more tailored analysis. The use of one or more virtual features to determine whether a portion of received data exhibits at least a first threshold of suspiciousness, maliciousness and/or anomalous characteristics and/or behaviors prior to performing an in-depth static and/or dynamic analysis, leads to fewer false positives. Thus, real-time traffic analysis enables a malware/threat detection system (e.g., deployed within a network appliance) to determine whether a portion of data exhibits at least a first threshold of suspiciousness, maliciousness and/or anomalous characteristics and/or behaviors more efficiently and accurately than pre-filter mechanisms that merely employ feature and/or signature matching techniques.

In one embodiment, the threat detection system receives an object to analyze. Subsequently, the object is passed to a real-time traffic analysis (RTTA) logic within the threat detection system. The RTTA logic parses the object looking for features of a predefined feature set. During parsing, the RTTA logic maintains a representation of the detected features of the predefined feature set as "observations," and the value of each instance of the observation, if applicable. In one embodiment, the representation of values of detected features maintained by the RTTA logic may be a value for every instance of a detected feature (e.g., a size value for every embedded object) or a count of the number of instances of a feature (e.g., the number of JavaScript instances, embedded objects, Universal Record Locators (URLs) or other features that may appear multiple times within an object or portion of network traffic). In a second embodiment, the representation of detected features maintained by the RTTA logic may be a subset of the values of every instance of a detected feature. In such an embodiment, the RTTA logic may maintain the representation of detected features by eliding certain, similar values (e.g., omit duplicate values and/or merge similar values into ranges) of a detected feature. Upon completion of parsing, the representation of the values of detected features may be recorded in a storage device for accessing during an evaluation performed by the RTTA logic.

Once the object has been parsed and any values of observations have been recorded, the RTTA logic evaluates each feature-condition pairing set forth in the virtual feature against the value, or set of all values of the corresponding observation. As is defined below, the virtual feature is a combination of one or more feature-condition pairings, wherein the combination may be represented as a logical expression. Thus, in instances in which an observation has a value, the set of all values of an observation is paired with one or more conditions. In some embodiments, depending on the content of the received data, an observation may have a plurality of values (e.g., when observation$_X$, for example, is the size of an attachment to an email, observation$_X$ will have a plurality of values when, for example, an email under analysis includes a plurality of attachments, wherein at least a first attachment has a different size than a second attachment).

Following the evaluation of each feature-condition pairing against the value, or set of all values of the corresponding observation, the RTTA logic generates an observation vector based on the feature-condition pairing evaluation and determines whether the observation vector is a member of the truth set corresponding to the virtual feature. A notification that the virtual feature was observed is provided to a RTTA score determination logic within the threat detection system. The threat detection system then generates a score indicating the level of suspiciousness and/or maliciousness of the portion of analyzed received data. In one embodiment, when the score is above a first threshold, the reporting logic may generate an alert that the object is malicious. When the score is greater than a second threshold but lower than the first threshold, the object may be provided to the static analysis logic and/or the dynamic analysis logic for further analysis. When the score is less than the second threshold, the threat detection system may determine no further analysis is needed (e.g., the object is benign).

The use of one or more virtual features by a threat detection system enables several advantages over current systems by providing a more efficient and flexible analysis. Specifically, the analysis performed by the RTTA using one or more virtual features enables the RTTA to combine observable features with conditions derived via experiential knowledge and/or machine learning to target particular exploits, vulnerabilities or malware. Additionally, an analysis including evaluating feature-condition pairings of a virtual feature using at least one or more values of a representative set of observed values within an object provides increased efficiency by eliminating the need to analyze all observed values using a rule-based detection scheme.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory (computer-readable) storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. Malware may also correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. Additionally, malware may be code that initiates unwanted behavior which may be, as one example, uploading a contact list to cloud storage without receiving permission from the user. For convenience, the terms "malware" and "exploit" shall be used interchangeably herein unless the context requires otherwise.

The term "processing" may include launching an application wherein launching should be interpreted as placing the application in an open state and performing simulations of actions typical of human interactions with the application. For example, the application, an Internet browsing application may be processed such that the application is opened and actions such as visiting a website, scrolling the website page, and activating a link from the website are performed (e.g., the performance of simulated human interactions).

The term "network device" may be construed as any electronic device with the capability of connecting to a network, downloading and installing mobile applications. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, etc. Herein, the terms "network device," "endpoint device," and "mobile device" will be used interchangeably. The terms "mobile application" and "application" should be interpreted as software developed to run specifically on a mobile network device.

The term "malicious" may represent a probability (or level of confidence) that the object is associated with a malicious attack or known vulnerability. For instance, the probability may be based, at least in part, on (i) pattern matches; (ii) analyzed deviations in messaging practices set forth in applicable communication protocols (e.g., HTTP, TCP, etc.) and/or proprietary document specifications (e.g., Adobe PDF document specification); (iii) analyzed compliance with certain message formats established for the protocol (e.g., out-of-order commands); (iv) analyzed header or payload parameters to determine compliance, (v) attempts to communicate with external servers during processing in one or more VMs, (vi) attempts to access memory allocated to the application during virtual processing, and/or other factors that may evidence unwanted or malicious activity.

The term "virtual feature" may be interpreted as a combination of one or more feature-condition pairings, where the combination may be suspicious, malicious or unwanted. Additionally, a first virtual feature may be used as a feature within a second virtual feature. In one embodiment, the combination may be expressed as a logical expression having one or more "terms," wherein a term may include one or more feature-condition pairings.

The term "feature" may be interpreted as a static trait that may be included in or exhibited by an object, group of objects or sub-object. Examples of features include, but are not limited or restricted to, a size of an object or sub-object, presence of an embedded object, size of an embedded object, number of embedded objects, presence of a URL in the object, number of URLs in the object, presence of a predefined signature, adherence or non-adherence to a predefined rule or protocol.

The term "observation" may be interpreted as features actually observed/detected within object, sub-object, etc. (for example, during or after parsing once the incoming traffic has been received).

The term "condition" may be interpreted as whether a predefined characteristic is present within the portion of network traffic being analyzed (e.g., a flow, a group of objects, an object, and/or a sub-object). Additionally, a condition may be a numeric evaluation such that a determination is made as to whether the set of all observed values of the feature include a particular number, intersect a given range, and/or contain any members greater than or less than a predefined threshold.

The term "observation vector" may be interpreted as a representation of the results of an evaluation of each condition with its corresponding feature, as evaluated for each feature-condition pairing of a single, virtual feature. In one embodiment, such a representation may take the form of a binary construct which may be understood as a vector or a one dimensional array. Herein, the term "observation vector" will be used but the use is not intended to limit the scope of the disclosure. In one example, a condition may be the presence of a feature. In a second example, a condition may be the size of the feature is greater than or equal to a predefined threshold. A condition may be applied to more than one feature (e.g., determining the presence of more than one feature) and/or a feature may be evaluated by more than one feature-condition pairing (e.g., a first term, as described below, of the virtual feature may determine whether a feature is greater than a first threshold and a second term of the virtual feature may determine whether the feature is less than or equal to a second threshold).

The term "truth set" may be interpreted as a representation of the one or more possible results of the evaluation of the feature-condition pairings of a virtual feature based on the values of the observations (e.g., detected features) that satisfy the terms of the corresponding virtual feature, where there is one truth set per virtual feature. The representation of the truth set may take the form of, for example, a set of binary vectors, wherein each binary vector represents a result of an evaluation of the feature-condition pairings of the virtual feature. All vectors included in the truth set represent solutions to the corresponding virtual feature.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized by a cyber-security platform for performing a real-time traffic analysis of a group of objects, an object and/or a sub-object to determine whether the group of objects, the object and/or the sub-object is to be provided to a static analysis logic and/or a dynamic analysis logic for further analysis as to whether the group of objects, the object and/or the sub-object is suspicious, malicious or unwanted. As this invention is susceptible to embodiments of many different forms, it is intended that the present disclosure is to be considered as an example of the principles of the invention and not intended to limit the invention to the specific embodiments shown and described.

II. Network Appliance Deployment

Referring to FIG. 1, an exemplary block diagram of a threat detection system 110 including a real-time traffic analysis logic 113 deployed within the network 100 is shown. In one embodiment, the network 100 may be an enterprise network that includes the threat detection system 110, a router 160, an optional firewall 161, a network switch 162, and one or endpoint devices 163. The network 100 may include a public network such as the Internet, a private network (e.g., a local area network "LAN", wireless LAN, etc.), or a combination thereof. The router 160 serves to receive data, e.g., packets, transmitted via a wireless medium (e.g., a Wireless Local Area Network (WLAN) utilizing the Institute of Electrical and Electronics Engineers (IEEE) 802.11 standard) and/or a wired medium from the cloud computing services 170 and the endpoint devices 163. As is known in the art, the router 160 may provide access to the Internet for devices connected to the network 110.

In one embodiment, the network switch 162 may capture network traffic, make a copy of the network traffic, pass the network traffic to the appropriate endpoint device(s) 163 and pass the copy of the network traffic to the threat detection system 110. In a second embodiment, the network switch 162 may capture the network traffic and pass the network traffic to the threat detection system 110 for processing prior to passing the network traffic to the appropriate endpoint device(s) 163. In such an embodiment, the network traffic will only be passed to the appropriate endpoint device(s) 163 if the analysis of the network traffic does not indicate that the network traffic is associated with malicious, anomalous and/or unwanted characteristics and/or behaviors.

The threat detection system 110 includes a communication interface 111, a storage device 112, a real-time traffic analysis (RTTA) logic 113, a RTTA score determination logic 114, a static analysis logic 120, a dynamic analysis logic 130, a classification logic 140, and a reporting logic 150.

As shown, the threat detection system 110 is communicatively coupled with the cloud computing services 170, the Internet and one or more endpoint devices 163 via the communication interface 111, which directs at least a portion of the network traffic to the RTTA logic 113. The RTTA logic 113 includes one or more modules that, when executed by one or more processors, performs a real-time traffic analysis on the portion of the network traffic by analyzing the portion of the network traffic in light of one or more features and/or virtual features. When the real-time traffic analysis results in a score that is greater than a first threshold, the portion of the network traffic is provided to the static analysis logic 120 and/or the dynamic analysis 130. The static analysis logic 120 may include one or more software modules that, when executed by one or more processors, performs static scanning on a particular object, namely heuristics, exploit signature checks and/or vulnerability signature checks for example. The static analysis logic 120 and the dynamic analysis logic 130 may be one or more software modules executed by the same processor or different processors, where these different processors may be located within the same processor package (e.g., different processor cores) and/or located at remote or even geographically remote locations that are communicatively coupled (e.g., by a dedicated communication link) or a network.

More specifically, as shown, static analysis logic 120 may be configured with heuristics logic 121, exploit matching logic 122, and/or vulnerability matching logic 123. Heuristics logic 121 is adapted for analysis of certain portions of an object under analysis (e.g., the object may include a binary file) to determine whether any portion corresponds to either (i) a "suspicious" identifier such as either a particular Uniform Resource Locator "URL" that has previously been determined as being associated with known exploits, a particular source or destination (IP or MAC) address that has previously been determined as being associated with known exploits; or (ii) a particular exploit pattern. When deployed, the exploit matching logic 122 may be adapted to perform exploit signature checks, which may involve a comparison of an object under analysis against one or more pre-stored exploit signatures (e.g., pre-configured and predetermined attack patterns) from signatures database 124. Additionally or in the alternative, the static analysis logic 120 may be configured with vulnerability matching logic 123 that is adapted to perform vulnerability signature checks, namely a process of uncovering deviations in messaging practices set forth in applicable communication protocols (e.g., HTTP, TCP, etc.). The term "signature" designates an indicator of a set of characteristics and/or behaviors exhibited by one or more exploits that may not be unique to those exploit(s). Thus, a match of the signature may indicate to some level of probability, often well less than 100%, that an object constitutes an exploit. In some contexts, those of skill in the art have used the term "signature" as a unique identifier or "fingerprint," for example, of a specific virus or virus family (or other exploit), which is generated for instance as a hash of its machine code, and that is a special sub-case for purposes of this disclosure.

The classification logic 140 may be configured to receive the static-based results (e.g., results from static analysis, metadata associated with the incoming network traffic, etc.), the VM-based results and/or the RTTA analysis results. According to one embodiment of the disclosure, the classification logic 140 comprises prioritization logic 141 and score determination logic 142. The prioritization logic 141 may be configured to apply weighting to results provided from the RTTA logic 113, the dynamic analysis logic 130 and/or the static analysis logic 120. Thereafter, the classification logic 140 may route the classification results comprising the weighting and/or prioritization applied to the RTTA results, the static-based results and/or the VM-based results to the reporting logic 150. The classification results may, among others, classify any malware and/or exploits detected into a family of malware and/or exploits, describe the malware and/or exploits and provide the metadata associated with any object(s) within which the malware and/or exploits were detected. Specifically, real-time traffic analysis using one or more virtual features may provide a tailored analysis such that each virtual feature may be directed to detecting characteristics typically representative of a particular exploit and/or type of attack (e.g., a ROP attack). Thus, use of the RTTA results may improve classification of a portion of network traffic (e.g., an object). The reporting logic 150 may generate an alert for one or more endpoint devices 163 and/or route the alert to a network administrator for further analysis. In addition, the reporting logic 150 may store the classification results (including the RTTA results, the static-based results and the VM-based results) in the storage device 112 for future reference. In one embodiment, results of the static analysis and/or the dynamic analysis may be provided to the RTTA logic 113 and/or the RTTA score determination logic 114. The RTTA logic 113 may evaluate one or more virtual features using the static analysis and/or the dynamic analysis results. The RTTA score determination logic 114 may utilize the results of the RTTA logic 113, the static analysis results and/or the dynamic analysis results to determine a score indicating a level of suspiciousness and/or maliciousness of the object. Additionally, the results of the evaluation performed by the RTTA logic 113 and/or the score determined by the RTTA score determination logic 114 may be provided to the classification logic 140 for use in classifying malware detected within the object.

When the static analysis logic 120 is provided at least a portion of the network traffic following a real-time traffic analysis by the RTTA logic 113, the static analysis logic 120 may perform a static analysis on the portion of network traffic. Subsequently, the static analysis logic 120 may route suspicious objects (and, in many cases, even previously classified malicious objects) to the dynamic analysis logic 130. In one embodiment, the dynamic analysis logic 130 is configured to provide, at least, an analysis of a binary included in the received network traffic and/or suspicious object(s) from the static analysis logic 120.

Upon receiving at least an object from the communication interface 111 and/or the static analysis logic 120, the dynamic analysis logic 130 performs processing within one or more VMs on the binary, e.g., the object is processed within the one or more VMs $131_1$-$131_j$ (where j≥1). The processing may occur within one or more virtual machine instances (VMs), which may be provisioned with a guest image associated with a prescribed software profile. Each guest image may include a software application and/or an operating system (OS). Each guest image may further include one or more monitors, namely software components that are configured to observe and capture run-time behavior of an object under analysis during processing within the virtual machine. During the processing within the virtual machine, the object is analyzed.

1. Logical Representation

Figure 2:
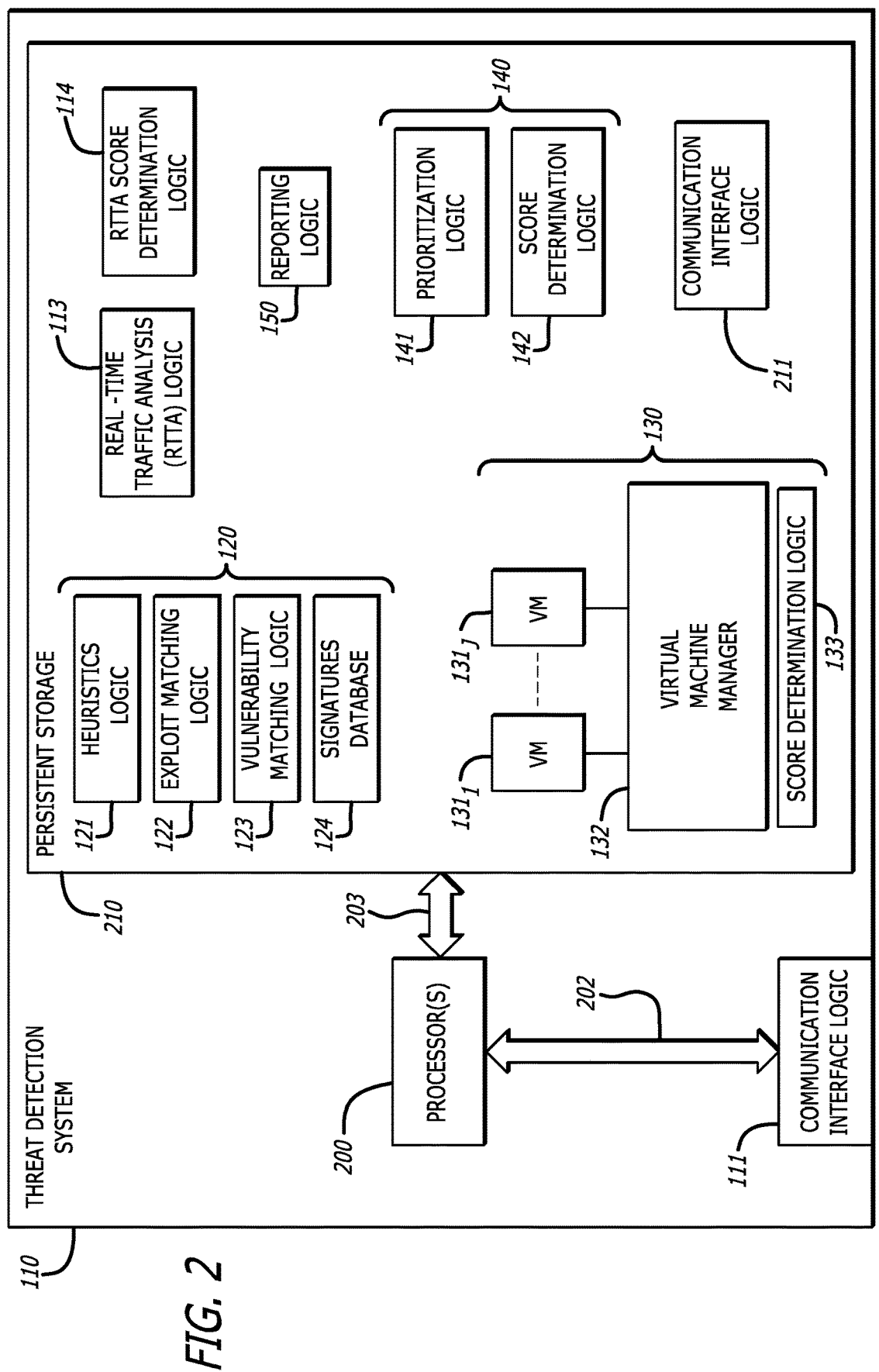
FIG. 2 is an exemplary embodiment of a logical representation of the threat detection system of FIG. 1.

FIG. 2 is an exemplary embodiment of a logical representation of the threat detection system of FIG. 1. The threat detection system 110 includes one or more processors 200 that are coupled to communication interface 111 via a first transmission medium 202. The communication interface 111, with the communication interface logic 211 located within a persistent storage 210, enables communication with network devices via the Internet, the cloud computing services and one or more the endpoint devices. According to one embodiment of the disclosure, the communication interface 111 may be implemented as a physical interface including one or more ports for wired connectors. Additionally, or in the alternative, the communication interface logic 111 may be implemented with one or more radio units for supporting wireless communications with other electronic devices.

The processor(s) 200 is further coupled to persistent storage 210 via a second transmission medium 203. According to one embodiment of the disclosure, persistent storage 210 may include (a) the static analysis logic 120 including a heuristics logic 121, an exploit matching logic 122, a vulnerability matching logic 123, and a signatures database 124, (b) a dynamic analysis logic 130 including one or more VMs $131_1$-$131_j$, a virtual machine manager (VMM) 132, and a score determination logic 133, (c) a classification logic 140 including a prioritization logic 141, and a score determination logic 142, (d) a real-time traffic analysis (RTTA) logic 113, (e) a RTTA score determination logic 114, and (f) a reporting logic 150. Of course, when implemented as hardware, one or more of these logic units could be implemented separately from each other.

Additionally, although not shown, the RTTA logic 113 and/or the RTTA score determination logic 114 may be incorporated within any of the modules illustrated in FIG. 2. For example, the RTTA logic 113 and the RTTA score determination logic 114 may be incorporated within the static analysis logic 120. Furthermore, the RTTA logic 113 may include one or more modules. In one embodiment, the RTTA logic 113 includes a parsing logic, a feature detection logic (which maintains at least a representative set of observed values for one or more features), a feature-condition pairing evaluation logic (which may evaluate one or more feature-condition pairings using one or more values of a representative set of observed values, generate a result (e.g., an observation vector) and use the observation vector as an index into a truth set to determine whether one or more of the observed values satisfies the terms of the virtual feature.

III. Real-Time Traffic Analysis Methodology

Figure 3:
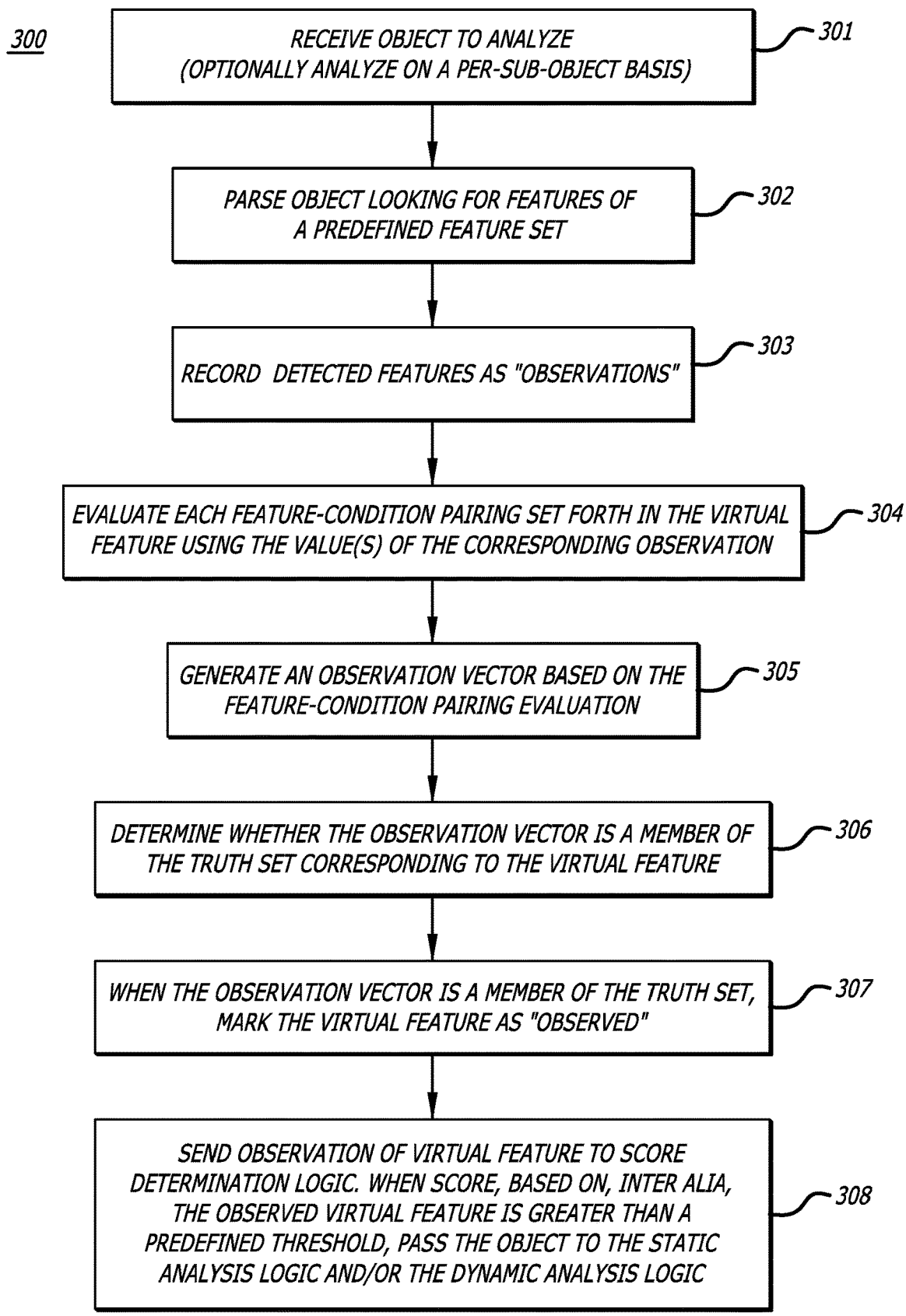
FIG. 3 is a flowchart illustrating an exemplary method for performing a real-time traffic analysis with the threat detection system of FIG. 1.

Referring to FIG. 3, a flowchart illustrating an exemplary method for performing a real-time traffic analysis with the threat detection system of FIG. 1 is shown. Each block illustrated in FIG. 3 represents an operation performed in the method 300 of performing a real-time traffic analysis of one or more objects (or one or more sub-objects) by the real-time traffic analysis logic within a threat detection system. For convenience, in the description of FIG. 3, the term "object" will be used but the method and claims are not limited to such a scope. Referring to FIG. 3, at block 301, the communication interface of the threat detection system receives an object to analyze (optionally analyze on a per-sub-object basis). Subsequently, the object is passed to the real-time traffic analysis logic, which parses the object looking for features of a predefined feature set (block 302).

At block 303, during parsing, the RTTA logic maintains a representation of detected features of the predefined feature set as "observations." For example, as illustrated in FIG. 5, the observations (e.g., detected features of the predefined feature set) may be recorded in a table. Alternatively, the observations may be stored in any representative form, examples include but are not limited or restricted to a linked list, hash table, vector or the like. Herein, for convenience, the term "table" will be used to refer to the representative form in which the observations are stored but is not intended to limited the scope of the disclosure.

Once the object has been parsed and any values of observations have been recorded, the RTTA logic evaluates each feature-condition pairing set forth in the virtual feature against the set of all the value(s) of the corresponding observation (block 304). As is defined above, the virtual feature is a combination of one or more feature-condition pairings, wherein the combination may be represented as a logical expression. Thus, each value of an observation is paired with one or more conditions. In some embodiments, depending on the content of the network traffic, an observation may have a plurality of values (e.g., when observation$_X$, for example, is the size of an attachment to an email, observation$_X$ will have a plurality of values when the email under analysis includes a plurality of attachments, wherein at least a first attachment has a different size than a second attachment).

Following the evaluation of each feature-condition pairing for each value of the corresponding observation, the RTTA logic generates an observation vector based on the feature-condition pairing evaluation (block 305). The RTTA logic subsequently determines whether the observation vector is a member of the truth set corresponding to the virtual feature (block 306). In one embodiment, the determination of whether the observation vector is a member of the truth set may be done by using the observation vector as an index into a truth table representing the truth set (e.g., whether the observation vector corresponds to a value within the truth table). When the observation vector is a member of the truth set, mark the virtual feature as "observed" (block 307).

When the virtual feature is marked as observed (e.g., the observation vector is a member of the truth set corresponding to the virtual feature), a notification that the virtual feature was observed is provided to the RTTA score determination logic. When the score generated by the RTTA score determination logic, based on, inter alia, the observed virtual feature is greater than a predefined threshold, the object is provided to the static analysis logic and/or the dynamic analysis logic for further analysis (block 308).

Referring to FIG. 4A, a sample illustration of a virtual feature is shown. For convenience, a sample virtual feature, the virtual feature 400, is shown but does not limit the scope of the claims. A virtual feature may have more or less feature-condition pairings than the virtual feature 400. The feature-condition pairings as illustrated in virtual feature 400 are as follows: (i) $Feature_A$; (ii) $Feature_N \geq K_1$; and (iii) $Feature_N > K_2$. As is illustrated, the features of virtual feature 400 are separated by logical operators. As discussed above, the use of one or more virtual features by a RTTA logic within a threat detection system enables the threat detection system to more efficiently and more accurately detect exploits, malware attacks and/or anomalous characteristics and/or behaviors as the virtual features provide a more tailored and directed detection. Thus, the RTTA logic more accurately determines on what data a more in-depth analysis should be performed.

Optionally, the results of the real-time traffic analysis may be provided to a classification logic to aid in classification of the object by potentially providing results of an analysis using the virtual feature that may be directed at detecting a specific exploit or type of attack.

Referring to FIG. 4B, a block diagram of a sample feature set from which the virtual feature of FIG. 4A is derived is shown. The virtual feature 400 is merely one embodiment of a virtual feature that may be derived from the feature set 410. The feature set 410 includes the one or more features as seen in FIG. 4B (in contrast to the feature-condition pairings as seen in FIG. 4C and mentioned above with respect to FIG. 4A). As mentioned above, for convenience, the sample virtual feature 400 is discussed herein; however, the scope of the claims is not so limited to the virtual feature 400, the feature set 410, the feature-condition pairings 420 of FIG. 4C, or the like.

The feature set 410 represents the features that the real-time traffic analysis logic will attempt to detect while parsing the object. Herein, the feature set 410 includes the two features as illustrated boxes 411 and 413. The feature of box 411 ($Feature_A$) is an embedded object, as illustrated in box 412. As will be shown below in FIG. 4C, $Feature_A$ corresponds to a "presence" condition such that the RTTA logic will parse the object for the presence of an embedded object. Herein, the feature is not a specific type of embedded object, but merely any embedded object (however, a feature may be directed to a specific type). The feature of box 413 ($Feature_N$) represents a numeric feature. In contrast to the $Feature_A$ that corresponds to the presence of a particular feature, $Feature_N$ corresponds to a numeric observation. Herein, the sample $Feature_N$ corresponds to the size of one or more embedded JavaScript instances.

Referring to FIG. 4C, a sample table containing feature-condition pairings corresponding to the virtual feature 400 of FIG. 4A is shown. As mentioned above, the feature-condition pairings 420 corresponding to the virtual feature 400 are set forth in the table of FIG. 4C. FIG. 4C. illustrates that a feature (herein, $Feature_N$) may correspond to more than one condition. $Feature_N$ is shown to correspond to the feature-condition pairings illustrated in boxes 422 and 423 ($Feature_N \geq K_1$, wherein $K_1$=200 kilobits (kb), and $Feature_N > K_2$, wherein $K_2$=300 kb, respectively). As will be discussed below, the evaluation of the observations will correspond to whether at least one observed value of $Feature_N$ satisfies the conditions corresponding to the one or more feature-condition pairings.

Additionally, as is shown in box 421, a condition may be whether a feature (herein, $Feature_A$) has been observed. The example feature-condition pairing corresponding to $Feature_A$ represents that the real-time traffic analysis logic will evaluate whether the presence of $Feature_A$ (an embedded object) has been observed. In contrast to the numeric $Feature_N$, the number of embedded objects is not important, the feature-condition pairing is directed toward the presence of the feature, and thus, the number of instances of an embedded object greater than one does not change the outcome of the condition evaluation.

Referring to FIG. 4D, a sample table containing the truth set corresponding to the virtual feature of FIG. 4A is shown. As is defined above, a truth set is a set of binary vectors consisting of one or more vectors that satisfy the terms of the corresponding virtual feature. Thus, the vectors (e.g., the left-most three columns of the table 430) marked with a '1' in the right-most column comprise the truth set corresponding to the virtual feature 400. The table 430 illustrates all possible vectors that may be derived from observations of the features, wherein the truth set is a subset of the table 430 consisting of {(0,0,1), (0, 1, 1), (1, 1, 0), (1, 1, 1)}.

Specifically, the left most column corresponds to the feature-condition pairing set forth in box 421 of FIG. 4C (the presence of $Feature_A$), the second left-most column corresponds to the feature-condition pairing set forth in box 422 of FIG. 4C (whether an observed instance of a value of $Feature_N$ is greater than or equal to 2 Mb), and the third left-most column corresponds to the feature-condition pairing set forth in box 423 of FIG. 4C (whether an observed instance of a value of $Feature_N$ is greater than 3 Mb). To explain further, a '0' in the right-most column of table 430 corresponds to the feature-condition pairing not being satisfied and a '1' corresponds to the satisfaction of the feature-condition pairing. As an example, the row 431 includes the boxes 432-434, which represent one possible vector that may be derived from the evaluation of the observations of the object. Specifically, the boxes 432-434 represent the vector wherein none of the feature-condition pairings were satisfied and the '0' in box 435 represents that the vector comprised of boxes 432-434 {(0, 0, 0)} is not a member of the truth set corresponding to the virtual feature 400 (e.g., failing to satisfy any of the feature-condition pairings does not satisfy the terms of the virtual feature 400.

In one embodiment, the virtual feature 400, the feature set illustrated in table 410, the feature-condition pairings illustrated in table 420 and the truth set illustrated in table 430 are generated prior to analysis of the object. Therefore, in one embodiment, a network appliance has been preconfigured with the virtual feature 400, the feature set illustrated in table 410, the feature-condition pairings illustrated in table 420 and the truth set illustrated in table 430 prior to receipt of an object to analyze.

The receipt of an object for analysis by a threat detection system and the analysis of the object by, at least, the real-time traffic analysis logic within the threat detection system will be discussed below in conjunction with a discussion of FIGS. 5-7.

2. Parse Objects Looking for Features

Upon receiving network traffic (or alternatively, one or more objects, flows, group of objects, etc., may be received by the threat detection system in other manners such as via transfer from a storage device or the like), the communication interface provides at least a portion of the network traffic to the real-time traffic analysis (RTTA) logic. For convenience, the discussion herein will be directed to the analysis of an object, but the scope of the claims is not so limited.

The RTTA logic may parse the object on a per-object or per-sub-object feature basis. This enables the threat detection system to perform real-time traffic analysis at different granularities. A higher granularity may provide more detail and/or information to the static analysis logic and/or the dynamic analysis logic, when the object is passed on. However, performing RTTA at a high level of granularity (e.g., on a sub-object basis) may sometimes result in more processing for RTTA logic. A lower granularity may result in less processing for RTTA logic.

While parsing the object, the RTTA logic attempts to detect the features comprising the feature set (here, Feature$_A$ and Feature$_N$). When the RTTA logic is evaluating object/sub-object for multiple virtual features, each virtual feature may use a different subset of the predefined feature set. Although not illustrated, the RTTA logic may be preconfigured with more than one virtual feature. In one embodiment, two or more virtual features may include the same subset of the feature set but the virtual features may be different (e.g., a first virtual feature may have a different order of feature-condition pairings separated by different logical operators than a second virtual feature).

3. Record Detected Features as "Observations"

Referring to a presence feature, such as Feature$_A$ of FIG. 4B, the RTTA logic maintains a representation of whether the presence feature was detected during parsing, as an "observation." For a presence feature, once the feature has been detected, the RTTA logic does not need to adjust the record of observations (as is illustrated in row 510 of FIG. 5). However, with respect to a numeric feature, such as Feature$_N$ of FIG. 4B, a representation of the set of all observed values of the numeric feature is maintained, which may be recorded either immediately or upon the completion of parsing (the recordation is illustrated in row 520 of FIG. 5).

For example, a first feature may be a size of an embedded object and a second feature may be the number of JavaScript instances in an object. In such an example, referring to the first feature, an observation will correspond to a value for each instance of an embedded object and referring to the second feature, an observation will correspond to a value representing the number of JavaScript instances detected. Referring to a numeric feature, in one embodiment, the RTTA logic maintains the set of all observations corresponding to a feature, because a first observation may not satisfy all feature-condition pairings of the applicable feature but a second observation may satisfy one or more other feature-condition pairings of the applicable feature. Therefore, in order to evaluate the virtual feature using the entire object/sub-object, each observation (i.e., a value) of each detected instance of a numeric feature is to be recorded. Alternatively, in a second embodiment, the RTTA logic may maintain a representation of detected values corresponding to a feature that elides certain, similar values.

In one embodiment, a first numeric feature is the size of an embedded object, the RTTA logic maintains a representation of the set of all observations of embedded objects (a first value represented in the set corresponding to a first detected embedded object and a second value represented in the set corresponding to a second detected embedded object). Note that in such an example, the RTTA logic does not need to maintain duplicates (e.g., when a first embedded object and a second embedded object have the same size, a single entry in the representation of the set of all observations may be sufficient). When a second numeric feature is the number of, for example, JavaScript instances within a portion of network traffic, the RTTA maintains a representation (e.g., a count) of the number of JavaScript instances detected during parsing and records the final numeric value upon completion of the parsing.

Referring to FIG. 5, a block diagram of a sample table containing recorded observation values corresponding to the virtual feature of FIG. 4A and a sample object received by the threat detection system is shown. The values set forth as being observed in incoming traffic discussed herein, for example in FIGS. 5-7, are provided merely for convenience, but the scope of the claims is not necessarily so limited.

Herein, Observation$_A$ corresponds to the observed value of Feature$_A$ and a set, Observation$_{N-1}$-Observation$_{N-3}$, corresponds to the observed values of Feature$_N$. According to FIG. 5, the received object for analysis did not include an embedded object, hence, the value of Observation$_A$ is "Absent," illustrated in in row 510. In contrast, FIG. 5 illustrates that three instances of embedded JavaScript were detected in the object, having values 160 kb, 220 kb and 310 kb, as shown in the set illustrated in row 520.

4. Evaluate Feature-Condition Pairings

As defined above, a "condition" may be either the presence of a feature or a numeric evaluation (e.g., above or below a threshold, within a specific numeric range, etc.). The evaluation of a feature-condition pairing includes determining whether the one or more detected values of an observation intersect with the subset of all possible values of that feature that satisfy the condition. The evaluation of each feature-condition pairing results in a "yes" or "no" answer. This may be represented in any manner such that there are two indicators, one representing an intersection and one representing no intersection (e.g., binary—'1' and '0').

Referring to FIG. 6, a block diagram of a sample table containing values representing feature-condition pairing evaluations corresponding to the virtual feature of FIG. 4A and the sample object received by the threat detection system of as discussed in FIG. 5 is shown. As mentioned above, the values set forth as being observed in incoming traffic discussed herein are provided merely for convenience, but the scope of the claims is not necessarily so limited. Column 610 represents the features of the virtual feature 400, column 611 represents the observation values as discussed with respect to FIG. 5, and column 612 represents the result of evaluation of the feature-condition pairing using the observed values. As Observation$_A$ has a value of "Absent," (i.e., an embedded object was not detected within the object), the result of the evaluation of the feature-condition pairing is negative, or '0' (illustrated in row 601). As the RTTA logic detected three values of Feature$_N$, feature-condition pairings involving Feature$_N$ are evaluated against a set representation of those three values. Thus, illustrated in row 602, two observed values of Observation$_N$, 220 kb and 310 kb (shown via highlighting), result in a positive evaluation of the feature-condition pairing (Feature$_N$>200 kb), which results in a '1' in box 625. Row 603 illustrates that only one value of ObservationN, 310 kb, results in a positive evaluation, or '1' in box 628 (shown via highlighting in box 627).

5. Generate Observation Vector

The observation vector, as defined above, is a binary representation of the evaluation of the feature-condition pairings. Specifically, the observation vector contents are ordered according to ordering of the corresponding feature-condition pairing from the virtual feature.

Figure 7:
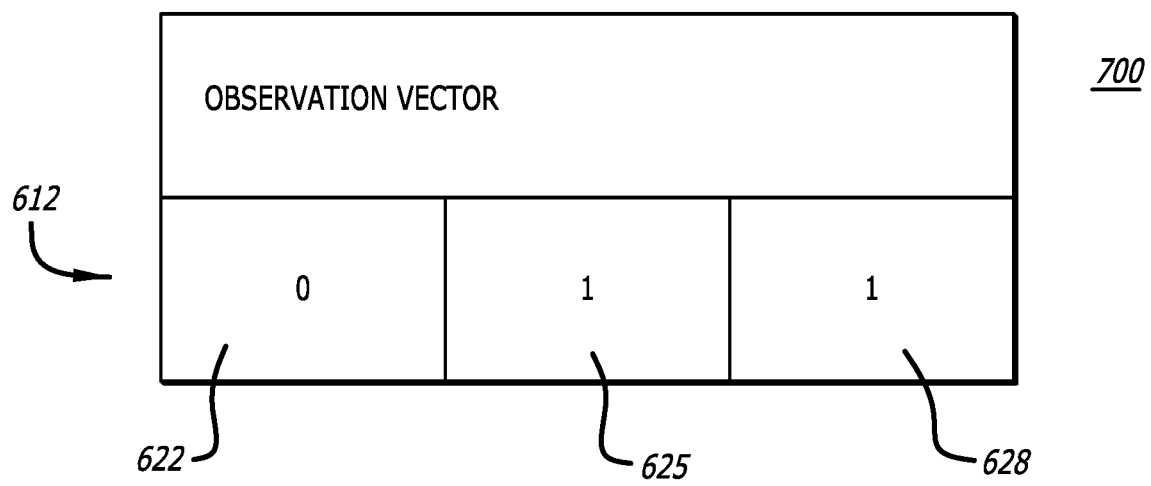
FIG. 7 is a block diagram of a sample table containing the generated observation vector corresponding to feature-condition pairing evaluations as illustrated in FIG. 6.

Referring to FIG. 7, a block diagram of a sample table containing the generated observation vector corresponding to feature-condition pairing evaluations as illustrated in FIG. 6 is shown. As is illustrated in FIG. 6, the observation of table 700 corresponds to the results of the feature-condition pairings set forth in FIG. 5. Specifically, upon evaluating one or more values of the observations (e.g., detected features), the RTTA generates an observation vector by placing the results of the feature-condition pairings into a binary vector.

The observation vector of FIG. 6 was generated by the RTTA logic by placing the result of the feature-condition pairing evaluation of Feature$_A$ (box 622) in the left-most column of table 700. Similarly, the RTTA logic places the result of the feature-condition pairing evaluation of Feature$_N$>200 kb (box 625) in the center column of table 700 and the result of the feature-condition pairing evaluation of Feature$_N$>300 kb (box 628) in the right-most column of table 700. Thus, the observation vector generated as a result of evaluating the feature-condition pairings using the observed values of the feature set corresponding to virtual feature 400 is {(0, 1, 1)}.

6. Determine Membership of Observation Vector in Truth Set

As defined above, the truth set corresponding to the virtual feature is a set of the one or more binary vectors that each satisfy the terms of the virtual feature. The determination as to whether the observation vector is a member of the truth set (and thus satisfies the terms of the virtual feature) is done by determining whether the observation vector matches a binary vector within the truth set.

Referring to FIGS. 4D and 7, once the RTTA logic has generated the observation vector, the RTTA logic determines whether the observation vector is a member of the truth set. As discussed above with respect to FIG. 4D, the truth set corresponding to the virtual feature 400 consists of {(0,0,1), (0, 1, 1), (1, 1, 0), (1, 1, 1)}. The RTTA logic determines whether the observation vector is a member of the truth set (i.e., whether a vector identical to the observation vector is found among the vectors comprising the truth set); when the RTTA logic determines a match between the observation vector and a vector within the truth set exists, the RTTA logic determines the observation set is a member of the truth set. As mentioned above, in one embodiment, the determination of whether the observation vector is a member of the truth set may be done by using the observation vector as an index into the truth table.

7. Mark Virtual Feature as "Observed" and Provide Observed Virtual Feature(s) to Score Determination Logic Once the observation has been determined to be a member of the truth set, the virtual feature is marked as "observed." The virtual feature may be marked as observed in the preconfigured feature set, making it available to subsequent virtual features, as well as to the RTTA score determination logic. Alternatively, the RTTA may mark which virtual features, if any, were observed in a separate table and pass the table to the RTTA score determination logic.

The RTTA score determination logic determines a score for the object that indicates a level of suspiciousness for the object. The score may be based on the one or more virtual features observed. In one embodiment, the score may also be based on the value(s) of one or more observations, and/or the presence or absence of one or more values. When the RTTA score determination logic determines a score that is above a predetermined threshold, the RTTA logic passes the object, or portion of network traffic that includes the object, to the static analysis logic and/or the dynamic analysis logic, as such a score indicates at least a first level of suspiciousness and/or malicious that warrants further analysis. In contrast, when the RTTA score determination logic determines a score that is not above the predetermined threshold, the RTTA logic does not provide the object, or portion of network traffic, to the static analysis logic or the dynamic analysis logic but may instead pass the object, or portion of the network traffic, on to one or more endpoint devices.

IV. Endpoint Device Deployment

In another embodiment, the threat detection system including real-time traffic analysis logic may be deployed in an endpoint device. Similar to the deployment discussed above regarding the network appliance, the threat detection system deployed within an endpoint device includes a real-time traffic analysis (RTTA) logic and a RTTA score determination logic. Data received by the endpoint device (e.g., via a network and/or data received via alternative manners, such as through a physical connection) is passed to the RTTA logic which parses the data and attempts to detect one or more features of a predefined feature set from which one or more virtual features are derived. The endpoint device may be pre-configured to include a threat detection system including the virtual feature(s), and the feature set (e.g., the threat detection system may be pre-installed on the endpoint device or may be installed on the endpoint device at any time prior to receipt of the data to be analyzed).

As discussed above, after detecting one or more features, and recording the representation of the values of each instance of that feature, if applicable, the RTTA logic evaluates the feature-condition pairings for a virtual feature using the observed/detected features (and values) and subsequently generates an observation vector based on the evaluation. The RTTA logic determines whether the observation vector is a member of the truth set that satisfies the terms of the virtual feature and, when the observation vector is a member of the truth set, an indication that the virtual feature was observed is passed to the RTTA score determination logic. The RTTA score determination logic determines a score indicating a level of suspiciousness, maliciousness and/or anomalous characteristics and/or behaviors. When the score is above a predetermined threshold, the threat detection system performs in-depth static and/or dynamic analysis on the portion of received data in order to determine whether the portion of data is suspicious, malicious or exhibits anomalous and/or unwanted characteristics and/or behaviors.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory storage medium having stored thereon logic, the logic being executable by one or more processors to perform operations including:
generating a virtual feature including one or more feature-condition pairings represented by a logical expression, each feature-condition pairing expressed as a combination of one or more features along with a condition applied to each corresponding feature of the combination of the one or more features, wherein each condition limits the corresponding feature to a value that, through experiential knowledge or machine learning techniques, is known to be suspicious or malicious;
detecting a plurality of features associated with an object, wherein each detected feature of the plurality of features constitutes a static characteristic included in or exhibited by the object;
observing values associated with each of the plurality of features;
performing a preliminary analysis by at least evaluating each observed value of the observed values associated with each of the plurality of features against the one or more feature-conditioned pairings of the virtual feature and generating an observation vector based on results of the preliminary analysis, wherein the results identify whether at least a first feature of the object having an observed value satisfies a condition of a feature-condition pairing of the one or more feature-condition pairings and the preliminary analysis is conducted to determine whether a static analysis or a dynamic analysis of the object is needed; and
responsive to the observation vector indicating that the virtual feature has been observed and the preliminary analysis determines that at least the one or more features associated with the object exhibits at least a first threshold of suspiciousness or maliciousness, performing one or more of (i) the static analysis to determine whether the object is associated with anomalous characteristics or (ii) the dynamic analysis to determine whether the object is associated with anomalous behaviors.

2. The non-transitory storage medium of claim 1, wherein preliminary analysis is configured to determine whether at least the first feature exhibits at least the first threshold of suspiciousness or maliciousness in response to the results of the preliminary analysis indicate at least the virtual feature has been observed in connection with the object.

3. The non-transitory storage medium of claim 2, wherein the results operate as an index for a representation of a truth set corresponding to the virtual feature.

4. The non-transitory storage medium of claim 1, wherein the one or more feature-condition pairings includes a group of features forming the virtual feature.

5. The non-transitory storage medium of claim 1, wherein the virtual feature is a combination of the one or more feature-condition pairings, the combination indicating a likelihood of the corresponding feature being an anomalous characteristic or an anomalous behavior based on the experiential knowledge or machine learning techniques.

6. The non-transitory storage medium of claim 5, wherein the anomalous characteristic includes a suspicious, malicious or unwanted characteristic or the anomalous behavior includes a suspicious, malicious or unwanted behavior.

7. The non-transitory storage medium of claim 1, wherein one or more observed values correspond to a size of an attachment to an email received as part of network traffic, the object being the attachment.

8. A computerized method comprising:
generating a virtual feature including one or more feature-condition pairings represented by a logical expression, each feature-condition pairing expressed as a combination of one or more features along with a condition applied to each corresponding feature of the combination of the one or more features, wherein each condition limits the corresponding feature to a value that, through experiential knowledge or machine learning techniques, is known to be suspicious or malicious;
detecting one or more features associated with an object, wherein each detected feature of the one or more features constitutes a static characteristic included in or exhibited by the object;
observing values associated with each of the one or more features;
performing a preliminary analysis in real-time by generating an observation vector constituting a representation of evaluations of each observed value of the one or more observed values against the one or more feature-condition pairings of the virtual feature, wherein the preliminary analysis is to determine whether further analyses are needed towards each corresponding feature with an observed value that satisfies a condition of a feature-condition pairing associated with the corresponding feature; and
responsive to the observation vector indicating that the virtual feature has been observed and the preliminary analysis determines that at least the one or more features associated with the object exhibits at least a first threshold of suspiciousness or maliciousness, performing one or more of (i) a static analysis to determine whether the object is associated with anomalous characteristics or (ii) a dynamic analysis to determine whether the object is associated with anomalous behaviors.

9. The method of claim 8, wherein the preliminary analysis is configured to determine whether at least the corresponding feature exhibits at least the first threshold of suspiciousness or maliciousness in response to results of the preliminary analysis indicate the virtual feature has been observed in connection with the object.

10. The method of claim 9, wherein the results operate as an index for a representation of a truth set corresponding to the virtual feature.

11. The method of claim 8, wherein the one or more feature-condition pairings includes a group of features forming the virtual feature.

12. The method of claim 8, wherein the virtual feature is a combination of the one or more feature-condition pairings, the combination indicating a likelihood of the corresponding feature being an anomalous characteristic or an anomalous behavior based on the experiential knowledge or machine learning techniques.

13. The method of claim 12, wherein the anomalous characteristic includes a suspicious, malicious or unwanted characteristic or the anomalous behavior includes a suspicious, malicious or unwanted behavior.

14. The method of claim 8, wherein one or more observed values correspond to a size of an attachment to an email received as part of network traffic, the object being the attachment.

15. The method of claim 8, wherein each feature included within the one or more feature-condition pairings of the virtual feature is set forth as a logical expression.

16. A system comprising:
one or more processors; and a non-transitory, storage medium communicatively coupled to the one or more processors and having instructions stored thereon, the instructions, upon execution by the one or more processors, cause performance of operations including:

parsing an object;

detecting one or more features associated with an object, wherein each detected feature of the one or more features constitutes a static characteristic included in or exhibited by the object;

observing one or more values associated with each of the one or more features;

generating a virtual feature including one or more feature-condition pairings represented by a logical expression, each feature-condition pairing expressed as a combination of one or more features along with a condition applied to each corresponding feature of the combination of one or more features, wherein each the condition limits the corresponding feature to a value that, through experiential knowledge or machine learning techniques, is known to be suspicious or malicious;

performing a preliminary analysis in real-time by conducting evaluations between each observed value of the one or more observed values against the one or more feature-condition pairings of the virtual feature, generating an observation vector constituting a representation of the evaluations, and directing further analyses toward each corresponding feature with an observed value that satisfies a condition of a feature-condition pairing associated with the corresponding feature; and responsive to the observation vector indicating that the virtual feature has been observed and the preliminary analysis determines that at least the one or more features associated with the object exhibits at least a first threshold of suspiciousness or maliciousness, performing one or more of a static analysis to determine whether the object is associated with anomalous characteristics or a dynamic analysis to determine whether the object is associated with anomalous behaviors.

17. The system of claim 16, wherein the preliminary analysis is configured to determine whether at least the corresponding feature exhibits at least the first threshold of suspiciousness or maliciousness in response to results of the preliminary analysis indicate the virtual feature has been observed in connection with the object.

18. The system of claim 17, wherein the results operate as an index for a representation of a truth set corresponding to the virtual feature.

19. The system of claim 16, wherein the one or more feature-condition pairings includes a group of features forming the virtual feature.

20. The system of claim 16, wherein the virtual feature is a combination of the one or more feature-condition pairings, the combination indicating a likelihood of the corresponding feature being an anomalous characteristic or an anomalous behavior based on the experiential knowledge or machine learning techniques.

21. The system of claim 20, wherein the anomalous characteristic includes a suspicious, malicious or unwanted characteristic or the anomalous behavior includes a suspicious, malicious or unwanted behavior.

22. The system of claim 16, wherein the preliminary analysis generates an observation vector constituting a representation of the evaluation of each of the one or more observed values against the one or more feature-condition pairings.

23. The system of claim 16, wherein one or more observed values correspond to a size of an attachment to an email received as part of network traffic, the object being the attachment.

* * * * *